US009413653B2

(12) United States Patent
Hara

(10) Patent No.: US 9,413,653 B2
(45) Date of Patent: Aug. 9, 2016

(54) COMMUNICATION SYSTEM AND SERVER

(71) Applicant: Yamaha Corporation, Hamamatsu-shi, Shizuoka-ken (JP)

(72) Inventor: Takahiro Hara, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 268 days.

(21) Appl. No.: 14/092,316

(22) Filed: Nov. 27, 2013

(65) Prior Publication Data

US 2014/0156870 A1 Jun. 5, 2014

(30) Foreign Application Priority Data

Nov. 30, 2012 (JP) ................................. 2012-263882
Nov. 19, 2013 (JP) ................................. 2013-239405

(51) Int. Cl.
 G06F 15/173 (2006.01)
 H04L 12/741 (2013.01)
 H04L 29/12 (2006.01)

(52) U.S. Cl.
 CPC ............ *H04L 45/74* (2013.01); *H04L 61/2557* (2013.01); *H04L 61/2589* (2013.01); *H04L 61/2575* (2013.01)

(58) Field of Classification Search
None
See application file for complete search history.

(56) References Cited

U.S. PATENT DOCUMENTS

| 8,086,740 B2* | 12/2011 | Tyukasz et al. ............... 709/227 |
| 8,713,664 B2* | 4/2014 | Smelyansky et al. ............ 726/11 |
| 8,799,485 B2* | 8/2014 | Rao et al. ....................... 709/228 |
| 8,825,822 B2* | 9/2014 | Boire-Lavigne et al. ...... 709/223 |
| 2007/0157303 A1 | 7/2007 | Pankratov |
| 2008/0215669 A1* | 9/2008 | Gaddy et al. ................... 709/203 |

FOREIGN PATENT DOCUMENTS

WO WO-2010/094047 A1 8/2010

OTHER PUBLICATIONS

European Search Report mailed Feb. 28, 2014, for EP Application No. 13194425.8, nine pages.
Ford, B. et al. (Oct. 2003). "Peer-to-Peer (P2P) communication across middleboxes," draft-ford-midcom-p2p-01.txt, Internet-Draft, The Internet Society, 28 pages.
Srisuresh, P. et al. (Mar. 2008). "State of Peer-to-Peer (P2P) Communication across Network Address Translators (NATs)," Network Working Group, Request for Comments: 5128, RFC 51218, The IETF Trust, 32 pages.
Takeda, Y. (Jun. 2003). "Symmetric NAT Traversal using STUN," draft-takeda-symmetric-nat-traversal-00.txt, Panasonic Communications Research Laboratory, Internet Engineering Task Force, Internet-Draft, 24 pages.
Audet, F. et al. (Jan. 2007). "Network Address Translation (NAT) Behavioral Requirements for Unicast UDP," Network Working Group: Best Current Practice, RFC 4787, located at http://www.ietf.org/rfc/rfc4787.txt, 29 pages.

* cited by examiner

*Primary Examiner* — John B Walsh
(74) *Attorney, Agent, or Firm* — Morrison & Foerster LLP

(57) ABSTRACT

In a communication system, using source address, source port number, destination address and destination port number, terminals A and B located behind NAT routers A and B, respectively, communicate with each other through the NAT routers A and B. A server SV which is not located behind any NAT routers identifies the NAT router A as a NAT router of a certain type which translates the source port number into a different source port number if the destination port number is changed. The server SV then guesses a port number obtained by adding (or subtracting) a value to (or from) the source port number used for transmission of data from the terminal A through the NAT router A as a port number of the terminal A in a case where the NAT router has been identified as the certain type, and informs the terminal B of the guessed port number.

13 Claims, 17 Drawing Sheets

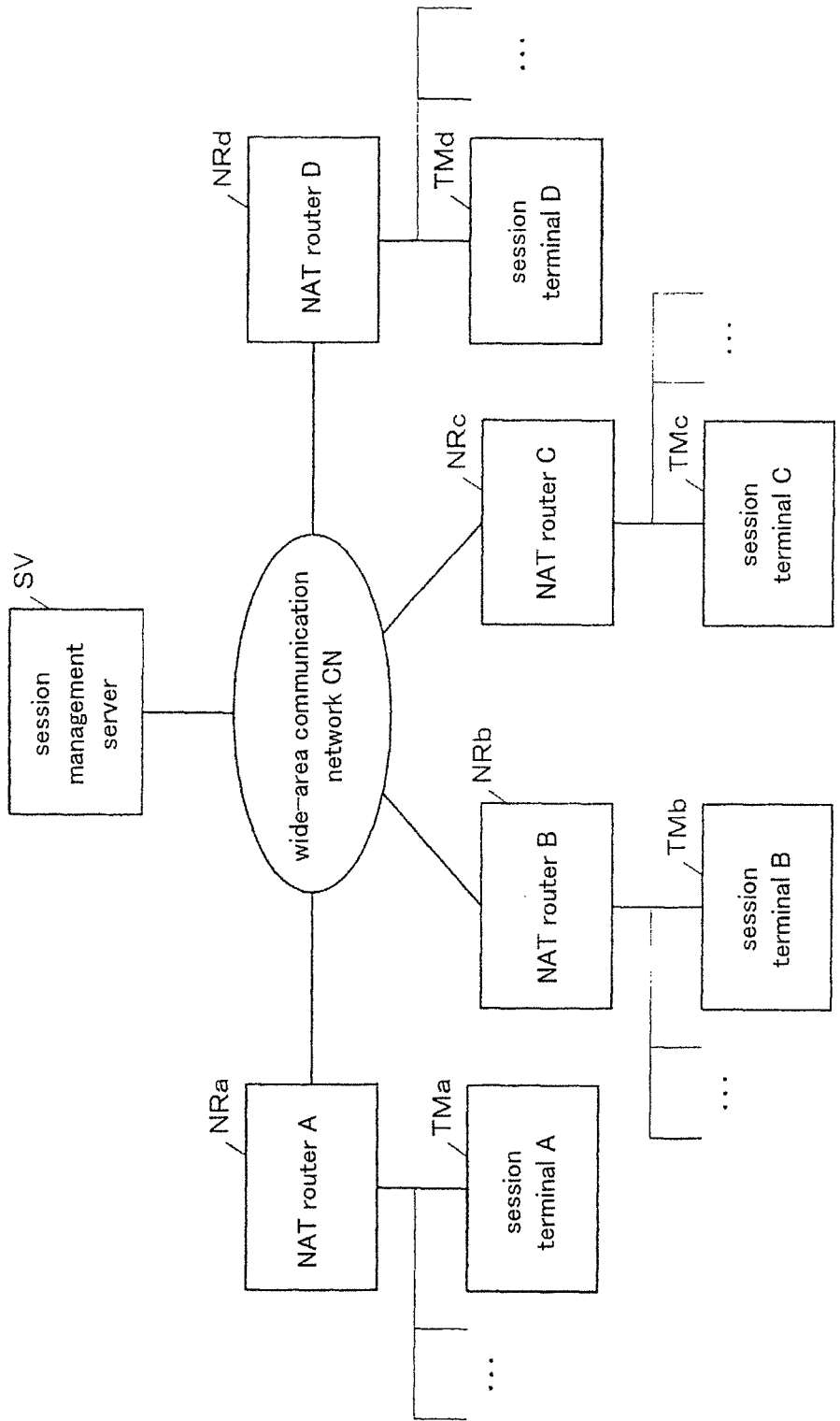

COMMUNICATION SYSTEM AND SERVER

BACKGROUND OF THE INVENTION

1. Field of the Invention

The present invention relates to a communication system and a server which allow terminals located behind NAT routers, respectively, connected to a wide-area communication network such as Internet to communicate directly with each other.

2. Description of the Related Art

Conventionally, there are known network session systems that enable musical sessions such as ensemble performance of musical instruments and chorus such as duet through a wide-area communication network such as Internet. The session systems are designed such that performance information based on musical performance played on a terminal is transmitted to a different terminal via a wide-area communication network, and vice versa so that both the terminals can generate musical tones played by the terminals. In a case where the terminals are located behind NAT (Network Address Translation) routers (on the local side), respectively, however, it is necessary for the terminals to traverse the NAT routers in order to directly exchange performance information between the terminals without a server.

The NAT technology is described in "RFC 4787" in "http://www.ietf.org/rfc/rfc4787.txt". The RFC 4787 is specifications disclosed by IETF (Internet Engineering Task Force) to explain NAT properties related to NAT traversal on unicast UDP. As behaviors of NAT routers, three patterns of Endpoint-Independent Mapping, Address-Dependent Mapping, and Address and Port-Dependent Mapping are commonly well known. Hereafter, these three behavior patterns of NAT routers will be explained. FIGS. 1A to 1D illustrate behavior patterns and issues of NAT routers. More specifically, in a case where source terminals such as PC (personal computers) located behind the respective NAT routers transmit packets by use of the same combination "source address: 192.168.0.1, source port number: 5000", the source address and source port are to be translated by the NAT routers of the three different patterns as indicated in FIGS. 1A to 1C.

"Pattern <1>" of FIG. 1A indicates the behavior of a NAT router of a type which conducts the same port translation for any destination address and destination port for transmission from a terminal located behind the NAT router by use of the same combination of a source address and a source port number. This pattern is defined as "Endpoint-Independent Mapping" by RFC 4787. In this pattern <1>, the same combination of "source address: 192.168.0.1, source port number: 5000" is used in both the upper and lower cases. In the upper case, "destination address: 2.2.2.2, destination port 20000" is sent, while in the lower case, "destination address: 3.3.3.3, destination port 40000" is sent. Despite the different destinations between the cases, the NAT router conducts the same port translation for the two cases because of the same source address and port. In both cases, therefore, the NAT router translates the source address and port into "source address 1.1.1.1, source port 10000", for example.

"Pattern <2>" of FIG. 1B indicates the behavior of a NAT router of a type which conducts different translations for different destination addresses in spite of transmission from a terminal located behind the NAT router by use of the same combination of the source address and the source port number, so that the translated source port numbers are sequential numbers ("1" is added to a previous translation result). This pattern is defined as "Address-Dependent Mapping" by RFC 4787. In this pattern <2>, the same combination of "source address: 192.168.0.1, source port number: 5000" is used in both cases. In the upper case, however, "destination address: 2.2.2.2, destination port: 20000" is sent, while in the lower case, "destination address: 3.3.3.3, destination port: 40000" is sent. In this pattern, the NAT router conducts different port translations between the cases because of different destinations despite the same source address and port. In the upper case, for example, the NAT router translates the source address and source port into "source address: 1.1.1.1, source port: 10000". In the lower case, the NAT router adds "1" to the previous translation result so that the source address and source port can be translated into "source address: 1.1.1.1, source port: 10001".

"Pattern <3>" of FIG. 1C indicates the behavior of a NAT router of a type which conducts different translations for the same destination address with different destination port numbers for transmission from a terminal located behind the NAT router by use of the same combination of the source address and the source port number, so that the translated source port numbers are sequential numbers ("1" is added to a previous translation result). This pattern is defined as "Address and Port-Dependent Mapping" by RFC 4787. In this pattern <3>, the same combination of "source address: 192.168.0.1, source port number: 5000" is used in both cases. In the upper case, however, "destination address: 2.2.2.2, destination port: 20000" is sent, while in the lower case, "destination address: 2.2.2.2, destination port: 30000" is sent. In this pattern, the NAT router conducts different port translations between the cases because of different destination ports despite the same destination address. In the upper case, for example, the NAT router translates the source address and source port into "source address: 1.1.1.1, source port: 10000". In the lower case, the NAT router adds "1" to the previous translation result so that the source address and source port can be translated into "source address: 1.1.1.1, source port: 10001".

In spite of attempts to realize direct communication between the two terminals located behind different NAT routers, the connection between the two terminals cannot be established due to the above-described influence of translation of source address and source port number by the respective NAT routers unless the respective terminals can be informed of their respective partner's translated port number and address by any manner.

For example, assume that a terminal PC 1 located behind the NAT router 1 and a terminal PC 2 located behind the NAT router 2 which know their respective partner's external (global) IP addresses: 3.3.3.3; 1.1.1.1 try to communicate with each other on the 5000th port. As indicated in FIG. 1D, more specifically, using the same combination of "source address: 192.168.0.1, source port number: 5000", the PC 1 transmits "destination address: 3.3.3.3, destination port: 5000", while the PC 2 transmits "destination address: 1.1.1.1, destination port: 5000". However, their respective source port numbers: 20000, 30000 translated by the NAT router 1 and the NAT router 2, respectively, do not agree with the destination port number: 5000 of the NAT router 2 and the NAT router 1, failing to traverse the NAT routers 2 and 1.

In such a case, communication is possible in the pattern <1> and the pattern <2> by using a technique generally known as "UDP hole punching". For example, a server located somewhere which is not behind any NAT is provided, so that the PC 1 and the PC 2 communicate with the server through the NAT router 1 and the NAT router 2, respectively, to allow the server to know the PCs' addresses and port numbers translated by the NAT routers 1 and 2. Then, the server informs the PC 1 that the address of PC 2 is 3.3.3.3, and the translated port number of PC 2 is 30000, and informs the PC 2 that the address of PC 1 is 1.1.1.1, and the translated port number of PC 1 is 20000. In a case where the NAT routers 1 and 2 are routers of pattern <1>, the PC 1 and the PC 2 transmit packets destined for the PC 1's address and port number and the PC 2's address and port number informed by the server, respectively, so that the packets can traverse the NAT routers. In FIG. 1D, although the PC 1 and the PC 2 have the same address "192.168.0.1" which is a local address, the local address of the PC 1 and the PC 2 may be either the same or different. In the other figures as well, furthermore, the local address may be either the same or different.

In a case where the NAT routers 1 and 2 are routers of pattern <2>, packets cannot traverse even if port numbers informed by the server are used. In many cases, however, source port numbers translated by the NAT router are sequential such as "30000"—"30001". Therefore, packets can traverse the NAT routers by sequentially trying previous and following port numbers such as port scanning. In the above-described example, if "30000" is unavailable, the PC 1 tries "30001" to traverse the NAT router. If "20000" is unavailable, the PC 2 tries "20001" to traverse the NAT router. In the pattern <2>, in other words, the source port number of packets will not change if the packets have the same destination address despite different destination port numbers as described below. Therefore, as long as the packets are destined for the same destination address, a combination that can traverse the NAT router can be found out by trying previous and following port numbers.

| (PC 1 side) source port translated by NAT | destination port |
|---|---|
| 20001 | → 30000 |
| 20001 | → 30001 ☺ |
| 20001 | → 30002 |
| ... | ... |

| (PC 2 side) source port translated by NAT | destination port |
|---|---|
| 30001 | → 20000 |
| 30001 | → 20001 ☺ |
| 30001 | → 20002 |
| ... | ... |

By using the UDP hole punching technique, as described above, communication by use of the NAT routers of the pattern <1> shown in FIG. 1A and the pattern <2> shown in FIG. 1B is available. In a case, however, where both the NAT routers 1 and 2 are pattern <3> of FIG. 1C, in other words, in a case of the NAT router which conducts different source port translations for packets having the same source address, source port number, and destination address but different destination port numbers, the UDP hole punching technique cannot cope with such type of NAT routers. Even if previous and following port numbers are tried sequentially as in the case of pattern <2>, more specifically, the NAT router only changes translated source port number at each try. As a result, there will be no match that allows traverse. If either of the NAT 1 or 2 is pattern <1> or <2>, communication is available by using the UDP hole punching technique, for source port numbers translated by the NAT router of pattern <1> or <2> will not be changed.

| (PC 1 side) source port translated by NAT | destination port |
|---|---|
| 20001 | → 30000 |
| 20002 | → 30001 |
| 20003 | → 30002 |
| 20004 | → 30003 |
| ... | ... |

| (PC 2 side) source port translated by NAT | destination port |
|---|---|
| 30001 | → 20000 |
| 30002 | → 20001 |
| 30003 | → 20002 |
| 30004 | → 20003 |
| ... | ... |

SUMMARY OF THE INVENTION

The present invention was accomplished to solve the above-described problem, and an object thereof is to provide a communication system and a communication method which allow direct communication between two terminals which are located behind separate NAT routers, respectively, by use of source address, source port number, destination address and destination port number even if the NAT routers are a type of NAT which conducts different source port translations for different destination ports. As for the following descriptions about respective constituent features of the present invention, furthermore, reference letters of corresponding components of an embodiment described later are provided in parentheses to facilitate the understanding of the present invention. However, it should not be understood that the constituent features of the present invention are limited to the corresponding components indicated by the reference letters of the embodiment.

It is a feature of the present invention to provide a server (SV) included in a communication system which is formed of a first terminal (TMa) located behind a first NAT router (NRa), a second terminal (TMb) located behind a second NAT router (NRb), and the server which is not located behind any NAT routers, and in which the first terminal and the second terminal communicate with each other through the first NAT router and the second NAT router by use of a source address, a source port number, a destination address and a destination port number, the server including a NAT type identifying portion (S4) for identifying the first NAT router as a NAT router of a certain type (pattern <3>) which translates the source port number into a different source port number if the destination port number is changed; a port number guessing portion (S8) for defining, in response to reception of data transmitted from the first terminal through the first NAT router in order to inform the second terminal of a source port number which the first terminal is to use for communication between the first terminal and the second terminal in a case where the first NAT router has been identified as the certain type by the NAT type identifying portion, a port number obtained by adding a value to the source port number used for transmission of the received data or by subtracting a value from the source port number used for transmission of the received data as a guessed port number; and a guessed port informing portion (S9) for informing the second terminal of the guessed port number defined by the port number guessing portion.

In this case, the certain type is, for example, a type of NAT router which sequentially changes source port number if the destination port number is changed in a case where data is transmitted by use of the same source address and source port number. Further, for example, the port number guessing portion defines a port number obtained by adding "+1" to the source port number used for transmission of the received data as a guessed port number. Furthermore, when the server has received first data and second data which had been transmitted from the first terminal through the first NAT router for identification of the type of the first NAT router such that each of the data has a different destination port number, the NAT type identifying portion identifies the first NAT router as the certain type on condition that a source port number used for transmission of the received first data is different from a source port number used for transmission of the received second data.

Furthermore, when the server has received the first and second data for identification of the type of the first NAT router, the NAT type identifying portion may identify the first NAT router as a type (pattern <1> or <2>) other than the certain type on condition that the source port number used for transmission of the received first data is the same as the source port number used for transmission of the received second data; and in a case where the first NAT router is identified by the NAT type identifying portion as the type other than the certain type, when the server has received data for informing the second terminal of source port number which the first terminal is to use for communication between the first terminal and the second terminal, the port number guessing portion may define the source port number used for transmission of the received data as the guessed port number. In this case, the type other than the certain type is a type (pattern <1>) which will not change source port number even if the destination address and the destination port are changed in data transmission using the same source address and source port number, or a type (pattern <2>) which sequentially changes source port number if the destination address is changed in data transmission using the same source address and source port number.

Another feature of the invention lies in a communication system which is formed of a first terminal (TMa) located behind a first NAT router (NRa), a second terminal (TMb) located behind a second NAT router (NRb), and a server (SV) which is not located behind any NAT routers, and in which the first terminal and the second terminal communicate with each other through the first NAT router and the second NAT router by use of a source address, a source port number, a destination address and a destination port number. The server of the communication system includes a NAT type identifying portion (S4) for identifying the first NAT router as a NAT router of a certain type (pattern <3>) which translates the source port number into a different source port number if the destination port number is changed; a port number guessing portion (S8) for defining, in response to reception of data transmitted from the first terminal through the first NAT router in order to inform the second terminal of a source port number which the first terminal is to use for communication between the first terminal and the second terminal in a case where the first NAT router has been identified as the certain type by the NAT type identifying portion, a port number obtained by adding a value to the source port number used for transmission of the received data or by subtracting a value from the source port number used for transmission of the received data as a guessed port number; and a guessed port informing portion (S9) for informing the second terminal of the guessed port number defined by the port number guessing portion. Furthermore, the first terminal includes a first data transmitting portion (C3, C5) for transmitting data for informing the second terminal of the source port number which the first terminal is to use for communication between the first terminal and the second terminal to the server through the first NAT router; and the second terminal communicates directly with the first terminal through the second NAT router and the first NAT router, using the guessed port number informed by the guessed port informing portion as the destination port number.

In this case as well, the certain type is a type of NAT router which sequentially changes source port number if the destination port number is changed in a case where data is transmitted by use of the same source address and source port number. Further, the port number guessing portion defines a port number obtained by adding "+1" to the source port number used for transmission of the received data as a guessed port number. Furthermore, the first terminal may further include a second data transmitting portion (C2, C3) for transmitting first data and second data for identification of the type of the first NAT router to the server through the first NAT router such that each of the first data and second data has a different destination port number; and when the server has received the first data and the second data which had been transmitted from the second data transmitting portion for identification of the type of the first NAT router, the NAT type identifying portion may identify the first NAT router as the certain type on condition that the source port number used for transmission of the received first data is different from the source port number used for transmission of the received second data.

In this case as well, when the server has received the first and second data transmitted by the second data transmitting portion for identification of the type of the first NAT router, the NAT type identifying portion may identify the first NAT router as a type (pattern <1> or <2>) other than the certain type on condition that the source port number used for transmission of the received first data is the same as the source port number used for transmission of the received second data; and in a case where the first NAT router has been identified by the NAT type identifying portion as the type other than the certain type, when the server has received data for informing the second terminal of source port number which the first terminal is to use for communication between the first terminal and the second terminal, the port number guessing portion may define the source port number used for transmission of the received data as the guessed port number. In this case as well, furthermore, the type other than the certain type is a type (pattern <1>) which will not change source port number even if the destination address and the destination port are changed in data transmission using the same source address and source port number, or a type (pattern <2>) which sequentially changes source port number if the destination address is changed in data transmission using the same source address and source port number.

The present invention configured as above enables two terminals located separately behind separate NAT routers to communicate directly with each other by use of source address, source port number, destination address and destination port number even through a NAT router which translates the source port number into a different source port number if the destination port number is changed.

The present invention can be embodied not only as the server or the communication system but also as a port number informing method and a computer program applied to a server, and a communication method applied to a communication system.

BRIEF DESCRIPTION OF THE DRAWINGS

FIG. 2 indicates an example configuration of a network session system according to an embodiment of the present invention;

DESCRIPTION OF THE PREFERRED EMBODIMENT

[Overview of System Configuration]

FIG. 2 indicates a configuration of the network session system according to the embodiment of the present invention. The network session system is a communication system formed of a session management server (also simply referred to as a server) SV, a plurality of NAT routers NR: NRa to NRd (letters "NR" represent a NAT router), and session terminals TM: TMa to TMd (letters "TM" represent a session terminal) located behind the NAT routers NR, respectively. The session management server SV, the NAT routers NR: NRa to NRd, and the session terminals TM: TMa to TMd are connected with each other via a wide-area communication network CN such as Internet so that they can communicate with each other.

The session management server SV is not located behind any NAT routers, but assists connections between the member session terminals TM. For instance, the session management server SV makes arrangements for connections between the respective session terminals TM before starting a session. After the establishment of the connections between the session terminals TM such as the session terminals TMa to TMd, performance information such as audio data is directly transmitted and received between the session terminals TMa to TMd located behind the NAT routers without the session management server SV.

Figure 1A:
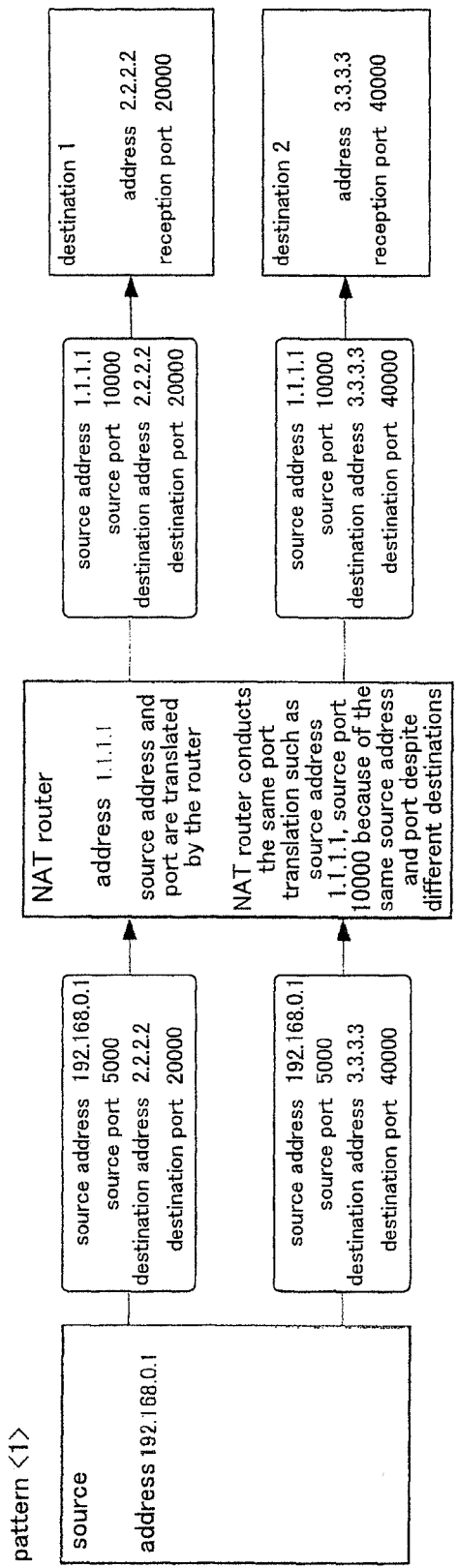
FIG. 1A is a diagram explaining an example endpoint-independent mapping which is pattern <1> of behavior patterns of NAT routers.
Figure 1B:
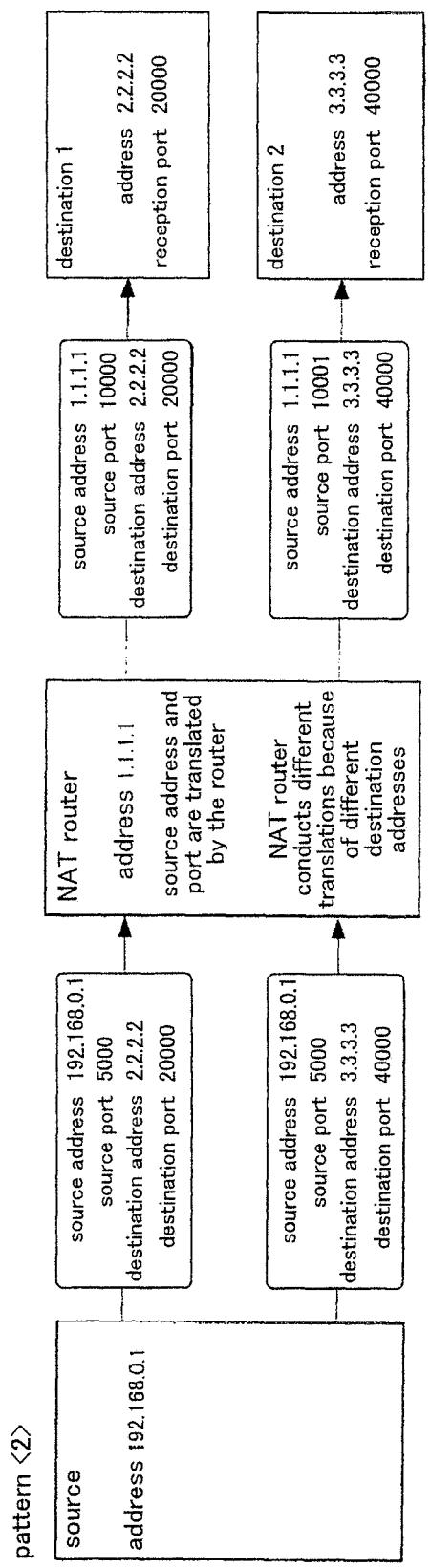
FIG. 1B is a diagram explaining an example address-dependent mapping which is pattern <2> of the behavior patterns of NAT routers.

Not only the session terminals TM shown in the figure but also a plurality of host apparatuses are located behind the NAT routers NR. Furthermore, each of the NAT routers NR has a NAT function of passing on data between a local network formed of the terminal and the apparatuses and the wide-area communication network CN and translating addresses and port numbers between the networks. More specifically, the respective NAT routers NR automatically translate randomly assigned local addresses and port numbers which are available only within the respective local networks into global addresses and port numbers available on the wide-area communication network CN, and vice versa. The NAT function has the three types of known patterns <1> to <3> as explained with reference to FIG. 1A to FIG. 1C.

The session terminals TMa to TMd which serve as network music session members are referred to as client terminals or simply referred to as clients, and are electronic musical apparatuses which are capable of playing a musical instrument and/or karaoke. In other words, each of the session terminals TM is a kind of computer having a capability of electronically processing music information, and can be an electronic musical instrument or an electronic musical apparatus such as a personal computer (PC) on which a musical information processing application has been installed. In some cases, however, an electronic musical instrument is used as a session terminal TM without karaoke. In some other cases, furthermore, a PC having the musical information processing application is used as a session terminal TM to perform only karaoke. FIG. 2 indicates four session terminals TM (session members) as an example. However, the number of session terminals TM is not limited to four (the number of session terminals TM can be greater and smaller than four).

[Procedures from Type Identification to Retrieval of Translated Address and Port]

The communication system according to the embodiment of the invention is formed of the session terminals (hereafter, referred to as "client terminals", or simply referred to as "clients" or "terminals") TMa to TMd located behind NAT routers NRa to NRd, respectively, and the session management server (hereafter, simply referred to as "server") SV which is not located behind any NAT. Using source address, source port number, destination address and destination port number, the client terminals TMa to TMd can directly communicate with each other via the NAT routers NRa to NRd, respectively. As explained with reference to FIG. 1D, however, even in a case where the NAT router NR behind which one client terminal TM is located is a "pattern <3>" (address and port-dependent mapping) type [see FIG. 1C] which conducts different source port number translations for different destination port numbers, it is necessary to establish communication (connections) between the terminals TMa to TMd. FIG. 3A to FIG. 3D indicate procedures ranging from NAT type identification to communication between two client terminals according to the embodiment of the invention. Hereafter, a case where a connection is to be established between the client terminal (A) TMa and the client terminal (B) TMb will be explained.

Figure 3A:
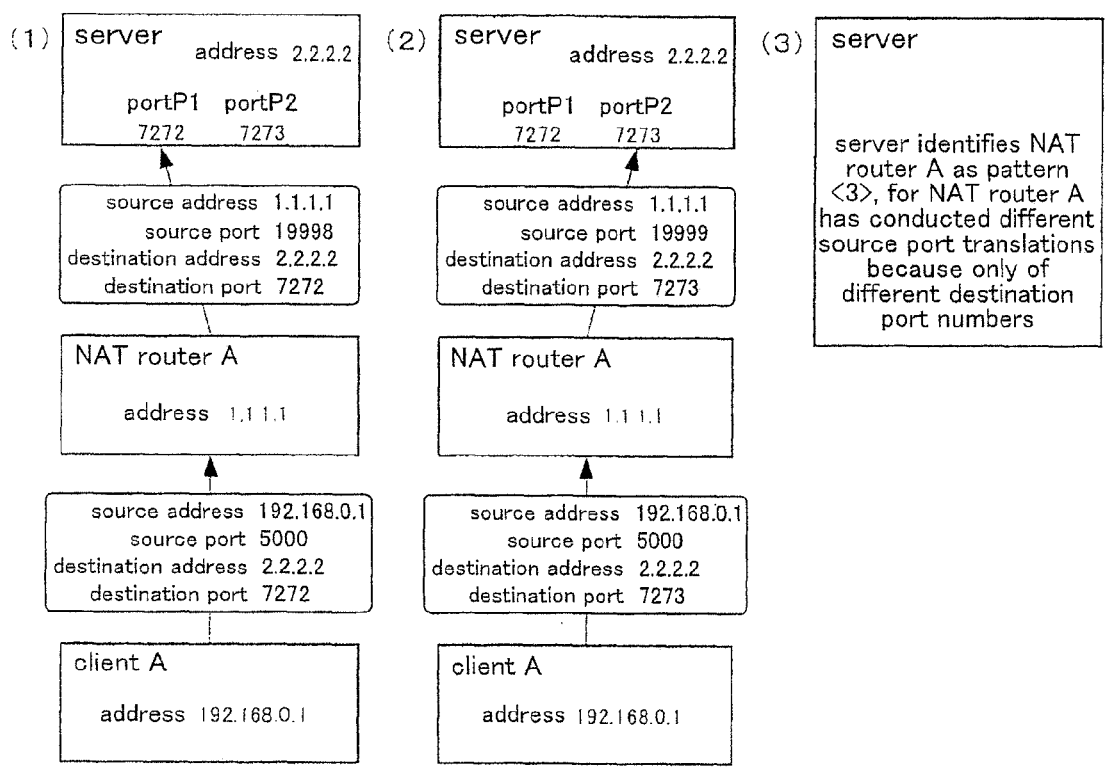
FIG. 3A indicates NAT type identification procedures according to the embodiment of the invention.

Prior to direct communication between the clients A and B, the NAT type identification shown in FIG. 3A is performed. In this case, the server SV previously opens two port numbers P1 and P2, while the client A transmits packets to the port numbers P1 and P2, respectively, when the client A is connected to the server SV via the NAT router A. Based on the reception of these packets (reception results), the server SV judges whether the NAT router A is the pattern <3> or not.

Figure 1C:
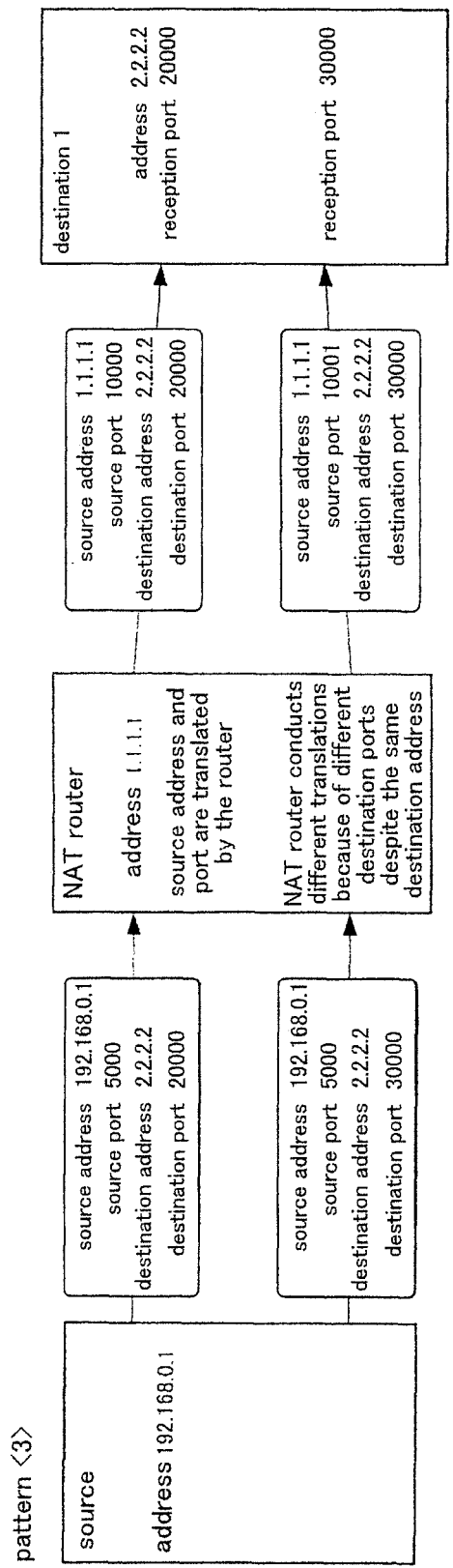
FIG. 1C is a diagram explaining an example address and port-dependent mapping which is pattern <3> of the behavior patterns of NAT routers.
Figure 1D:
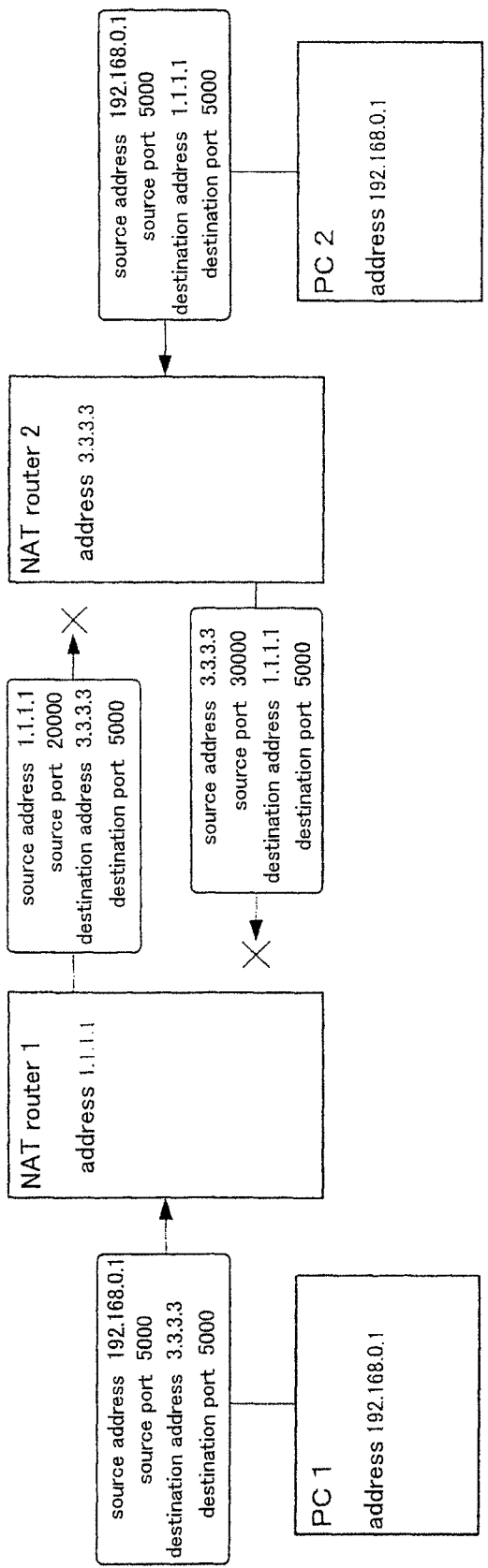
FIG. 1D is a diagram explaining problems in communication between two terminals located behind NAT routers.

As indicated in FIG. 3A, more specifically, using the same combination of "source address: 192.168.0.1 and source port number: 5000" for both the packets, similarly to FIG. 1C, a packet having "destination address: 2.2.2.2, destination port: 7272" indicative of the address of the server SV and the first port number P1="7272" is transmitted from the client A to the server SV via the NAT router A. Then, a packet whose destination port number is replaced with the second port number P2="7273" as indicated in FIG. 3A(2) is transmitted to the server SV. In comparison between the source port number=19998 of the packet received at the first port P1=7272 which the server SV received first and the source port number=19999 of the packet received at the second port P2=7273 which the server SV received next, as a result, the port numbers are incremented. As indicated in FIG. 3A(3), therefore, the server SV learns the change in source port translation results caused only by the change in destination port number to identify the NAT router A as pattern <3>.

By sending similar packets from the client B to the server SV as well, the server SV judges whether the NAT router B is pattern <3> or not. Later processing is the same as normal UDP hole punching as explained below. When it is judged that the NAT router A is pattern <3>, more specifically, the partner client B is informed of the number obtained by adding "1" to the port number used by the client A.

Figure 3B:
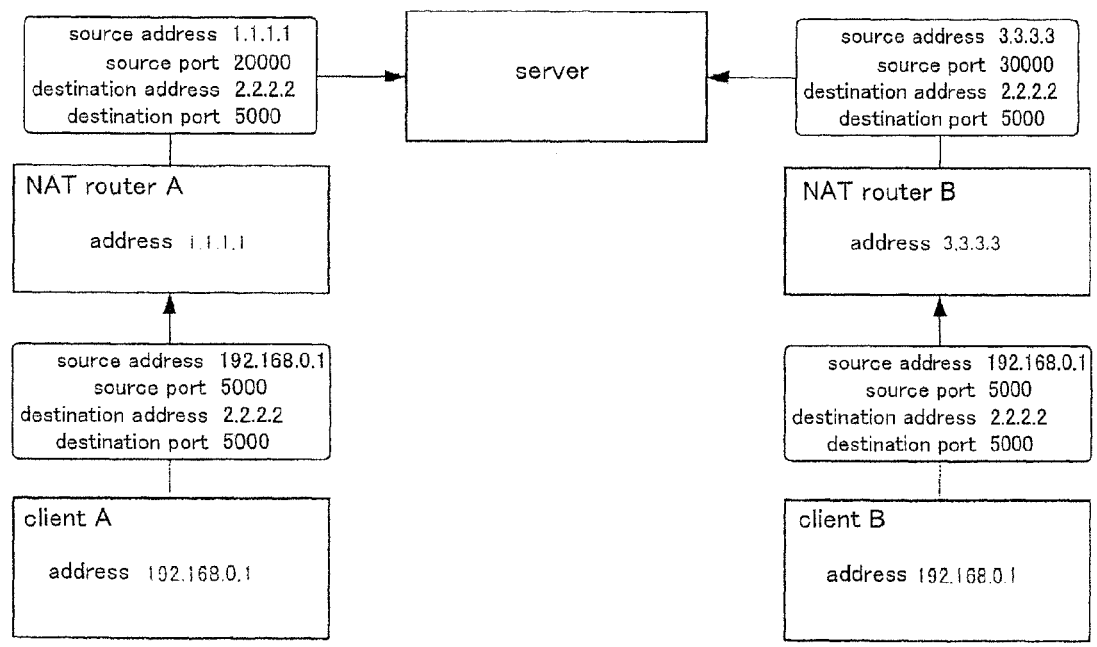
FIG. 3B indicates communication from clients A and B to a server.

After judgment of whether the NAT routers A and B to which the clients A and B belong, respectively, are pattern <3> or not as described above, data is transmitted from the clients A and B via the NAT routers A and B to the server SV as indicated in FIG. 3B. In this case, assume that the NAT router A is pattern <3>, while the NAT router B is a type other than pattern <3>. The server SV which knows NAT-translated source addresses and port numbers used in the data transmission informs the clients A and B of their respective partner's address and port number.

Figure 3C:
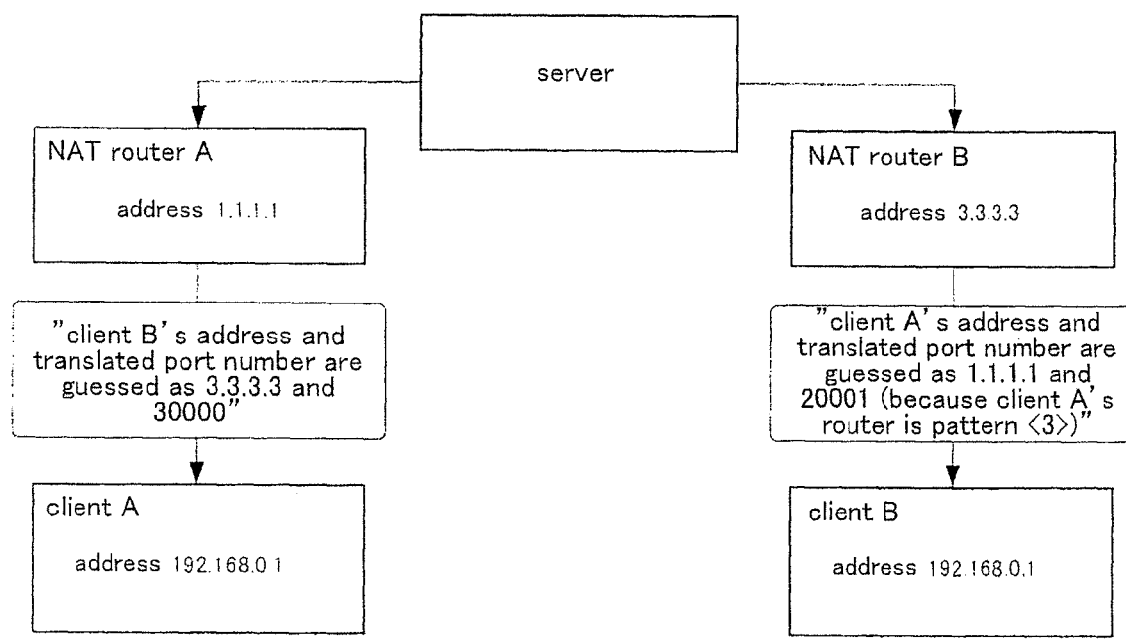
FIG. 3C indicates communication from the server to the clients A and B.

More specifically, when the server SV receives data transmitted from the client A via the NAT router A identified as pattern <3>, the server SV defines a port number obtained by adding "+1" to the source port number used in the transmission of the data as a guessed port number, and informs the partner client B, as indicated in FIG. 3C, that the client A's address and translated port number are guessed to be 1.1.1.1 and 20001, respectively (because the client A's router has been judged to be pattern <3>). When the server SV receives data transmitted from the client B via the NAT router B judged not to be pattern <3>, the server SV defines the port number used in the transmission of the data as a guessed port number, and informs the partner client A that the client B's address and translated port number are guessed to be 3.3.3.3 and 30000, respectively.

Figure 3D:
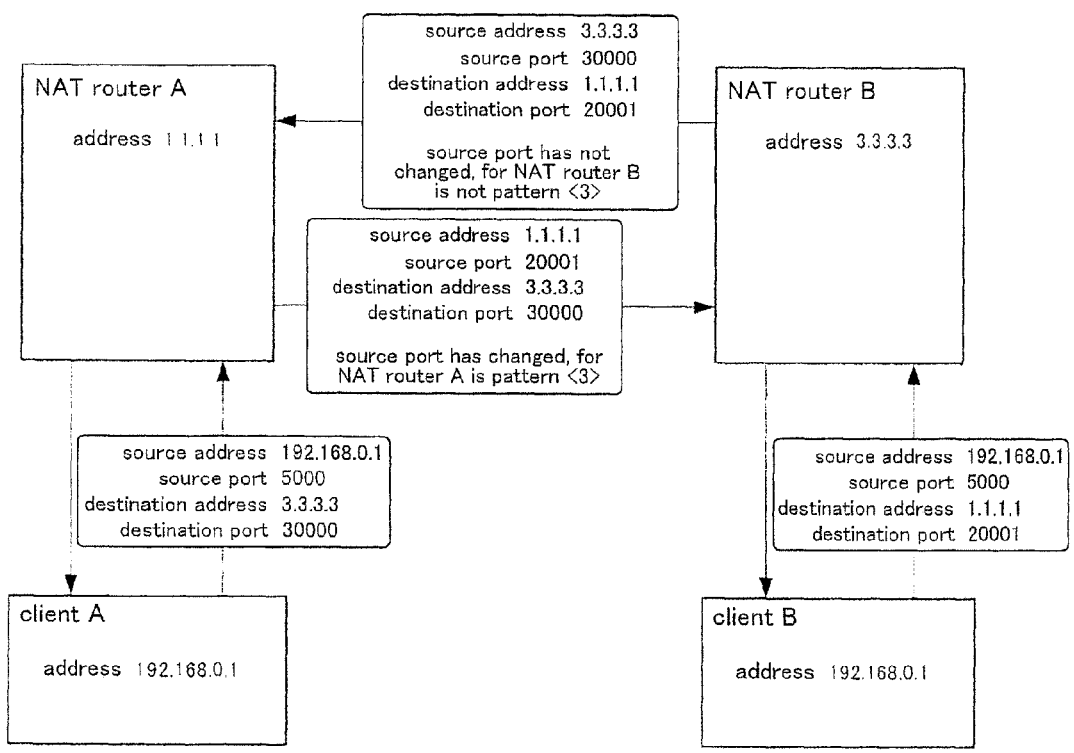
FIG. 3D indicates communication between the clients A and B.

Resultantly, by using the guessed port numbers informed by the server SV as destination port numbers, the clients A and B can directly communicate with each other via the NAT routers A and B. As indicated in FIG. 3D, more specifically, the clients A and B use the same combination of "source address: 192.168.0.1 and source port number: 5000", while the clients A and B transmit packets with destinations defined as "3.3.3.3, 30000" and "1.1.1.1, 20001", respectively, informed by the server SV. Therefore, even though the NAT router A which is pattern <3> changes source port by adding "1", the client B can add "1" to destination port number in accordance with the notification from the server SV, so that the port numbers agree with each other to allow packets to traverse to establish a connection between the clients A and B.

As explained above, the communication system according to the embodiment of the invention is formed of the terminals A and B which are behind the NAT routers A and B, respectively, and the server SV which is not behind any NAT. Using source address, source port number, destination address and destination port number, the terminals A and B communicate with each other via the NAT routers A and B. Prior to direct communications between the terminals A and B, the terminal A transmits the first and second sets of data to separate port numbers P1 and P2 of the server SV, respectively, via the NAT router A by use of the same source address and source port number [FIG. 3A (1) and (2)]. In accordance with the received first and second sets of data transmitted from the terminal A, the server SV recognizes that the NAT router A is a certain type (pattern <3>) of NAT router which conducts different source port number translations for packets having different destination port numbers [FIG. 3A (3)]. When the server SV receives data transmitted from the terminal A via the NAT router A identified as the certain type (pattern <3>), the server SV defines a port number obtained by adding "+1" to the source port number used in the transmission of the data as a guessed port number [FIG. 3B], and informs the terminal B of the guessed port number [FIG. 3C]. Using the informed guess port number as destination port number, the terminal B directly communicates with the terminal A via the NAT routers B and A [FIG. 3D].

First Operation Example

Figure 4A:
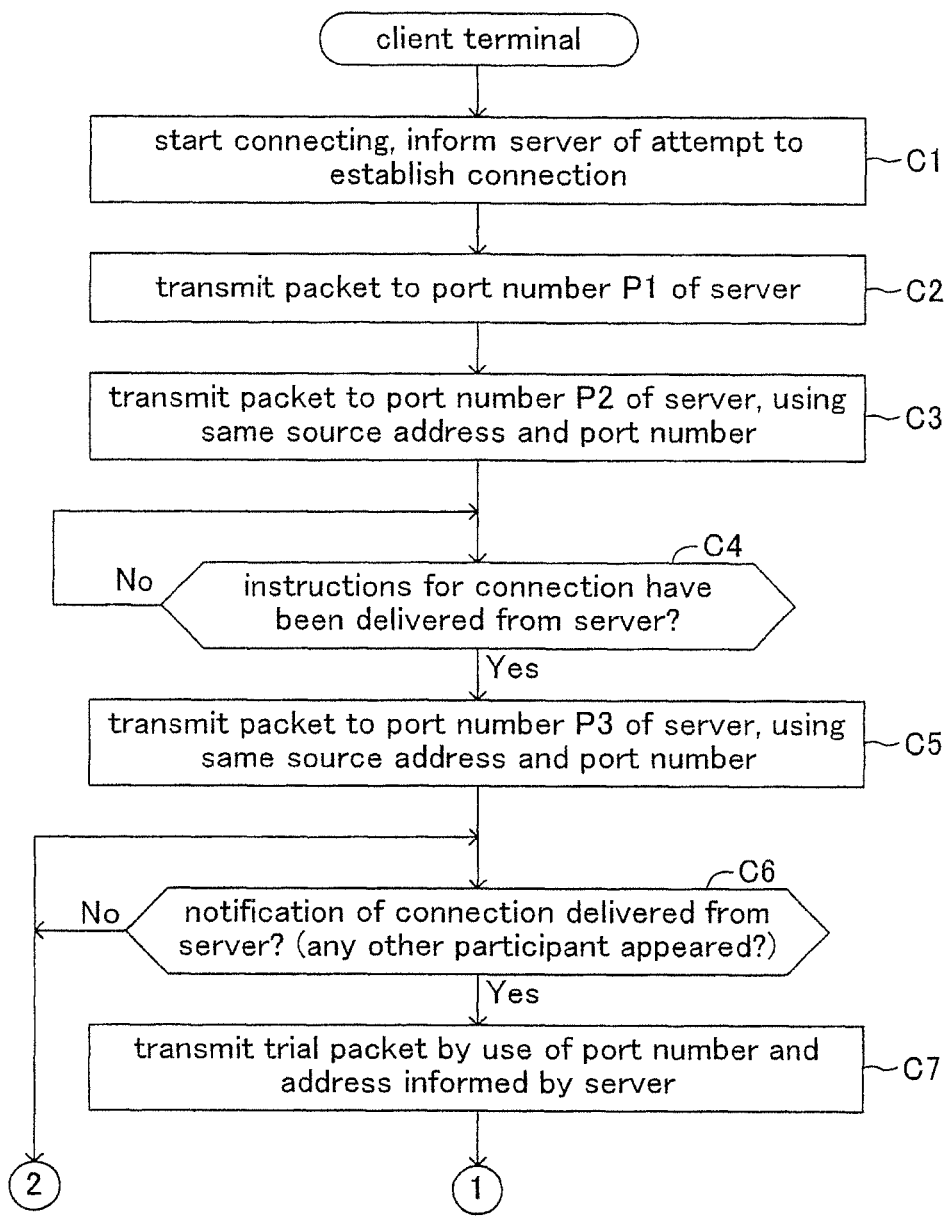
FIG. 4A indicates the first half of an example of the first connecting operation of the client terminal according to the embodiment of the invention.
Figure 4B:
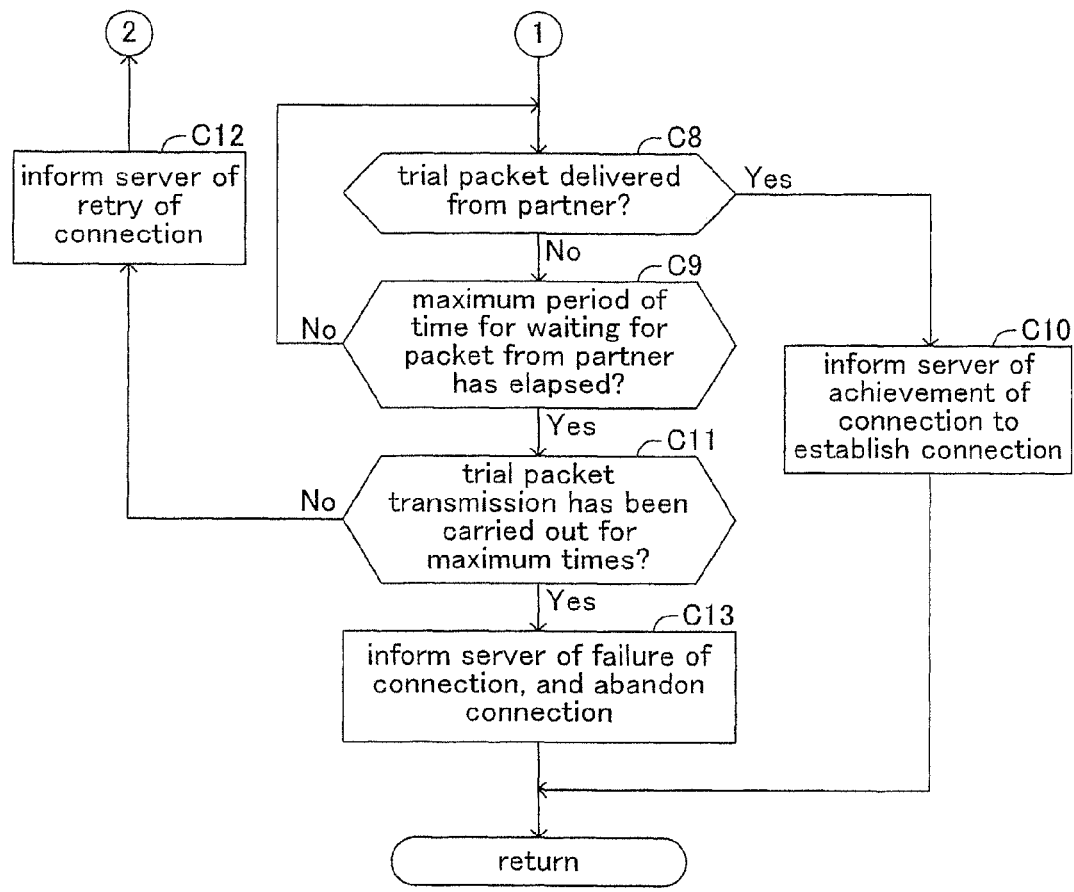
FIG. 4B indicates the latter half of the example of the first connecting operation of the client terminal.
Figure 5A:
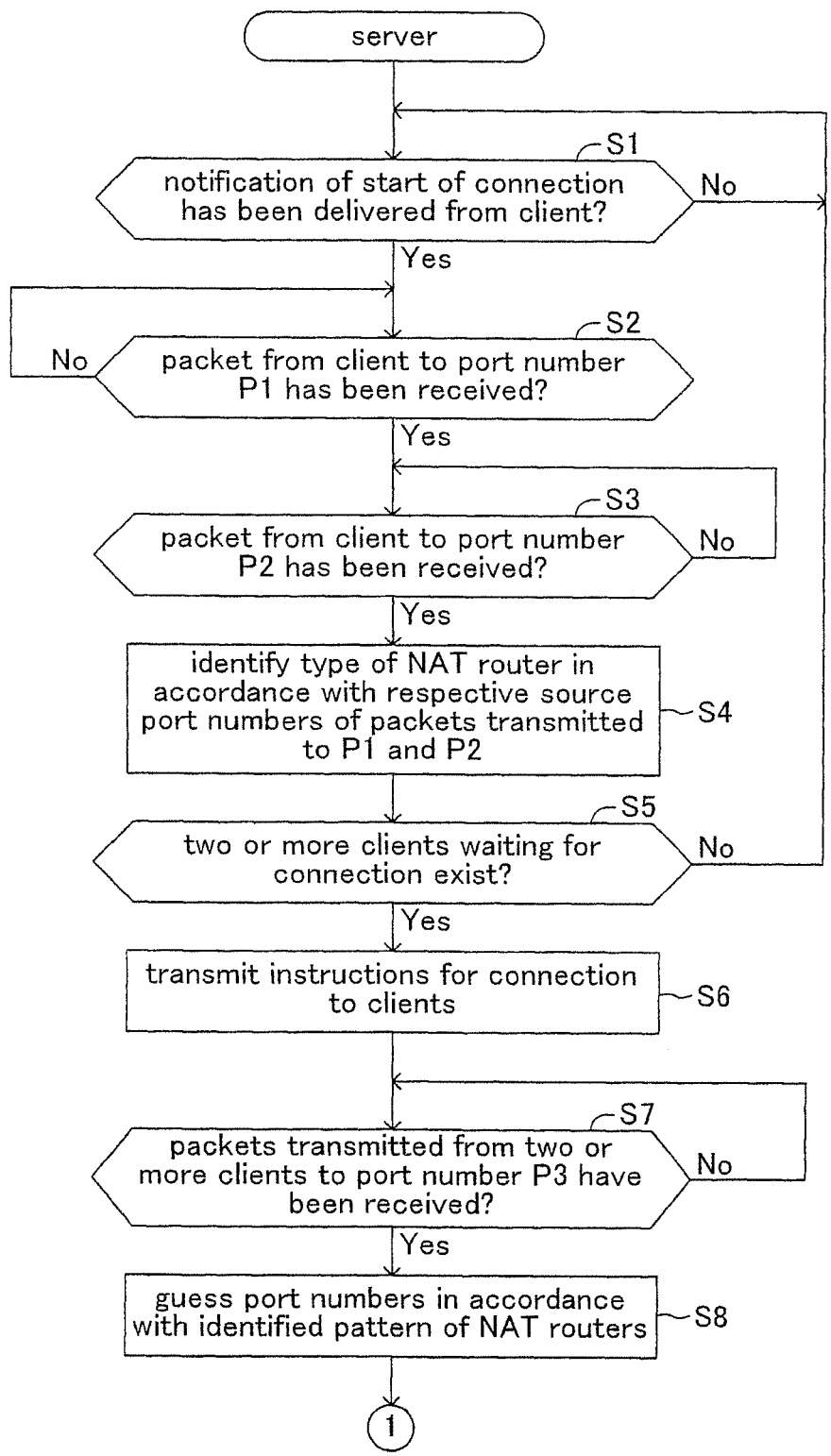
FIG. 5A indicates the first half of an example of the first connection assisting operation of the server according to the embodiment of the invention.
Figure 5B:
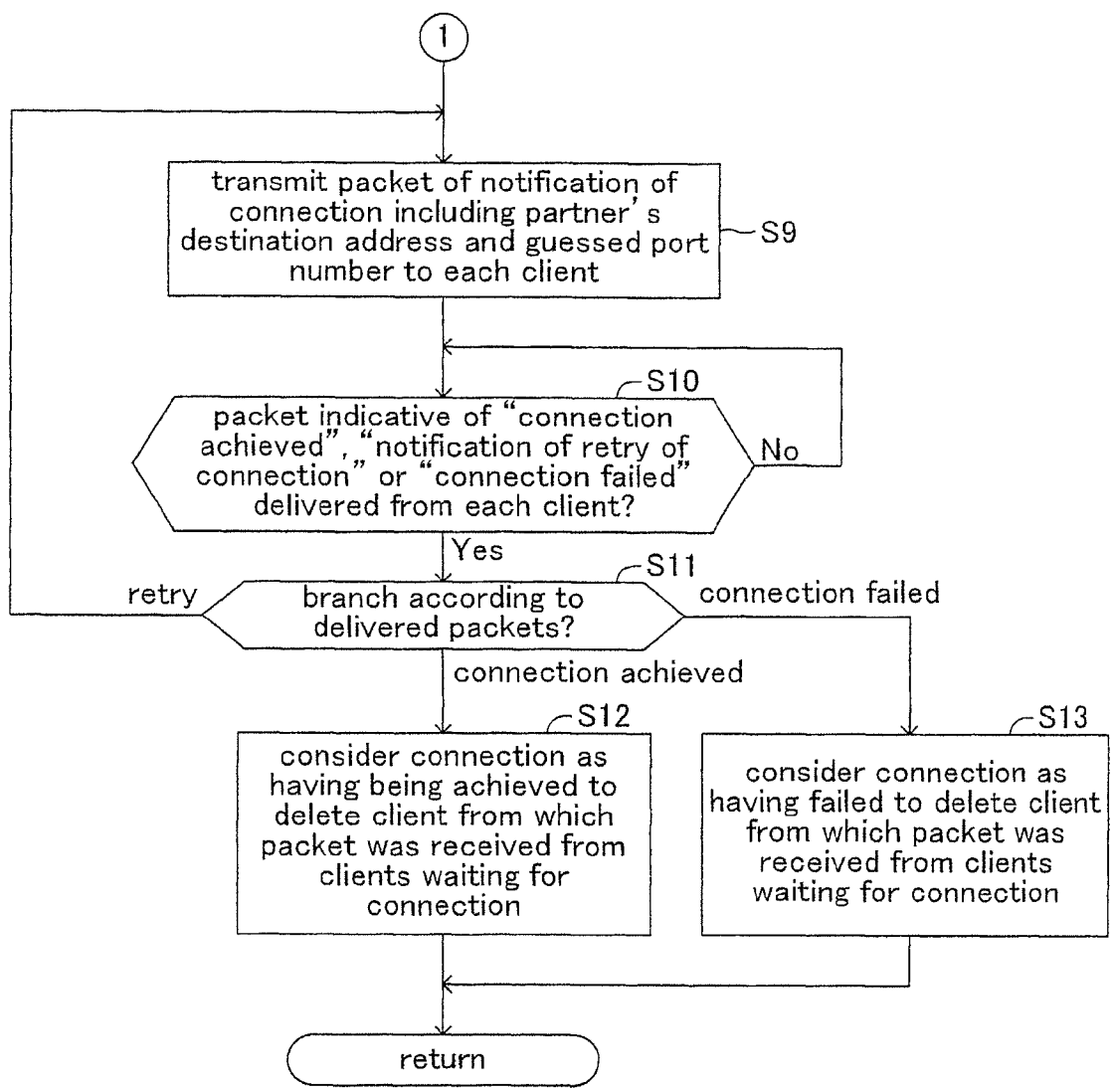
FIG. 5B indicates the latter half of the example of the first connection assisting operation of the server.

The first operation example will be explained. FIG. 4A and FIG. 4B indicate the first example connecting operation of the client terminal according to the embodiment of the invention. FIG. 5A and FIG. 5B indicate the first example connection assisting operation of the server according to the embodiment of the invention. In other words, FIG. 4A and FIG. 4B indicate a flowchart of a computer program according to the first example connecting operation, the program being executed by a CPU of the client terminal. FIG. 5A and FIG. 5B indicate a flowchart of a computer program according to the first example connection assisting operation, the program being executed by a CPU of the server.

In response to instructions to start connection by user's manipulation, the client terminal TM (the CPU serving as a control portion) starts executing the program indicated in FIG. 4A and FIG. 4B. At step C1, the client terminal TM informs the server SV of an attempt to establish connection. Then, the process proceeds to step C2 where the client terminal TM transmits a packet to the port number P1 of the server SV. At step C3, the client terminal TM transmits a packet, by use of the same source address and source port number as those used in the packet transmission at step C2, to the server SV's port number P2 which is different from the port number P1. These steps C2 and C3 are processing for transmitting packets for allowing the server SV to identify the NAT router behind which the client terminal TM is located.

At the next step C4, the client terminal TM judges whether or not instructions for connection have been delivered from the server SV. In other words, the client terminal TM judges whether instructions to start connection with a different client terminal TM have been delivered or not. If the instructions have not been delivered from the server SV, the client terminal TM gives "NO" at step C4, and waits for arrival of the instructions. In the above explanation, the transmission of packets from the one client terminal TM to the server SV was explained. In this state, however, the different client terminal TM with which the client terminal TM is to communicate is also waiting for arrival of instructions for connection from the server SV at step C4 after the steps C1 to C3.

On the other hand, the server SV starts executing the program indicated in FIG. 5A and FIG. 5B. At step S1, more specifically, the server SV judges whether the notification of the start of connection made at the above-described step C1 has been delivered from the client TM or not. In a state where the notification has not been delivered, the server SV gives "NO" at step S1 to wait for the notification of start of connection from the client terminal TM. When the notification of start of connection has been delivered, the server SV gives "YES" at step S1 to proceed to steps S2 and S3 to judge whether packets from the client TM to the port numbers P1 and P2 have been received or not, respectively. In a state where the packets from the client TM have not been received by the port numbers P1 and P2, the server SV gives "NO" at steps S2 and S3 to wait for reception of the packets.

As described above, when the server SV receives the packets transmitted from the client terminal TM to the port numbers P1 and P2, the server SV gives "YES" at steps S2 and S3 to proceed to step S4. At step S4, in accordance with source port numbers of the packets transmitted to the port numbers P1 and P2, the server SV identifies the type of the NAT router NR behind which the client terminal TM which has transmitted the packets is located. More specifically, if the source port numbers of the packets transmitted to the port numbers P1 and P2 are different with each other, the NAT router NR is identified as pattern <3>. If the source port numbers of the packets transmitted to the port numbers P1 and P2 are the same, the NAT router NR is identified as pattern <1> or <2>.

After the step S4, the server SV proceeds to step S5 to judge whether or not there are two or more clients TM waiting for connection. More specifically, it is judged whether, on the basis of transmission of packets to the port numbers P1 and P2 from two or more client terminals TM which are to communicate with each other, types of NAT routers behind which the two or more client terminals are located have been identified or not. If there are not two or more client terminals TM waiting for connection, the server SV gives "NO" at step S5 to return to step S1 to repeat the steps S1 to S5. In response to reception of packets at the port numbers P1 and P2 after the delivery of instructions for start of connection from the different client terminal TM, in other words, on the basis of the judgments of "YES" at the steps S1 to S3, the server SV identifies the type of NAT routers behind which the different client terminal is located by the step S4. Then, the server SV gives "YES" at step S5 to transmit instructions for connection to each of the two or more client terminals TM at step S6. The server SV then proceeds to step S7 to judge whether or not packets destined for port number 3 have been received from the two or more client terminals TM. The server SV keeps giving "NO" at step S7 to wait for the packets until the server SV receives the packets.

By the transmission of instructions for connection from the server SV, each of the client terminals TM gives "YES" at step C4 to judge that the instructions for connection have been delivered from the server SV to proceed to step C5. At step C5, each of the client terminals TM transmits a packet having the same source address and source port number as the case of steps C2 and C3 to the port number P3. Then, each of the client terminals judges at step C6 whether the notification of connection has been delivered form the server SV. At step C6, each client terminal keeps giving "NO" to wait for the notification of connection from the server SV until the notification is delivered. The step C4 also serves as a determination step for judging whether any client desiring to participate in communication with the client terminal TM has appeared or not.

If the server SV receives packets destined for the port number P3 from the two or more client terminals TM during waiting for the reception at the step S7, the server SV gives "YES" at step S7 to proceed to step S8. At step S8, the server SV guesses (determines) respective port numbers of the two or more client terminals TM in accordance with the respective types of NAT routers identified at step S4. In a case, more specifically, where the type of the NAT router behind which the client terminal TM is located was identified as pattern <3>, the server SV adds "+1" to the source port of the packet transmitted to the port number P3 to define the added port number as a guessed port number. In a case where the type of the NAT router behind which the client terminal TM is located was identified as not being pattern <3>, that is, in a case where the type of the NAT router was identified as pattern <1> or <2>, the server SV defines the same port number as the source port of the packet transmitted to the port number P3 as a guessed port number.

After the above-described step S8, the server SV proceeds to step S9 of FIG. 5B to transmit a packet indicative of notification of connection including a partner's address and guessed port number to each of the two or more clients TM to proceed to step S10. At step S10, the server SV judges whether or not a packet indicative of "connection achieved", "notification of retry of connection" or "connection failed" has been delivered from each of the clients TM. If not, the server SV gives "NO" at step S10 to wait for the packet. As for "connection achieved" on the determination at step S10, it is judged whether a notification has been delivered from each of the two or more client terminals to which the server SV had transmitted the instructions for connection at step S6. As for "notification of retry of connection" and "connection failed", however, it is judged whether the server SV has received a notification from any of the two or more client terminals.

When packets indicative of notification of connection are delivered to the client terminals, respectively, from the server SV, each of the client terminals gives "YES" at step C6 to proceed to step C7. At step C7, each of the client terminals tries to connect with its partner client terminal TM by transmitting a trial packet to its partner client TM by use of its partner client terminal's port number and address informed by the server SV. More specifically, the client terminal TM transmits a packet to the informed port number and address. Then, the client terminal TM successively transmits packets to previous and following port numbers of the informed port number and the informed address. The previous and following port numbers of the informed port number are some port numbers obtained, for example, by adding "1", "2", "3", . . . to the informed port number, and some port numbers obtained by subtracting "1", "2", "3", . . . from the informed port number.

The reason why packets are transmitted to the different port numbers, respectively, is as follows. If the NAT router behind which the partner client terminal is located is the above-described pattern <1> or <3>, the informed port number and address agree with the partner client's destination port and destination address. Therefore, the trial packet addressed to the informed port number and address is to be delivered to the partner client terminal TM. If the NAT router behind which the partner client terminal is located is the above-described pattern <2>, however, the address informed by the server SV is the same as the destination address of the partner client terminal TM, but the port number informed by the server SV is smaller than the destination port of the partner client terminal TM by "1". In this case, therefore, the trial packet destined for the port number obtained by adding "+1" to port number informed by the server SV and the address informed by the server SV is to be delivered to the partner client terminal TM. In a case where any port of the NAT router behind which the partner client terminal TM is located happens to be occupied regardless of the pattern of the NAT router of the partner client terminal TM, the NAT router can change the port number to a vacant previous or following port number of the port number informed by the server SV. In this case, the trial packet of the informed port number or a port number to which "+1" is added may not be delivered to the partner client terminal. In order to cope with such a case, the first example operation is designed such that, in addition to transmission of a trial packet to the informed port number and address, trial packets destined for previous and following port numbers of the informed port number and the informed address are also transmitted.

The first example operation may be modified, without considering the case where a port of the NAT router of the partner client terminal TM happens to be occupied, such that trial packets are transmitted only to the informed port number and address, and a port number obtained by adding "+1" to the informed port number and the informed address. In this modification, if any trial packet has not been delivered to the partner client terminal TM, retransmission of trial packets which will be described later is to be executed.

After the above-described step C7, each of the client terminals proceeds to step C8 to judge whether or not a trial packet has been delivered from the partner client TM with which the client terminal intends to connect. In a state where the trial packet has not been delivered, the client terminal TM gives "NO" at step C8 to proceed to step C9. At step C9, each of the client terminals TM judges whether or not the maximum period of time for waiting for a packet from the partner client TM has elapsed. While the maximum period of time has not elapsed yet, the client terminal TM gives "NO" at step C9 to return to step C8 to repeat the steps C8 and C9 until a trial packet is delivered from the partner client TM or until the maximum period of time elapses.

During the loop processing of the steps C8 and C9, each of the client terminals gives "YES" in response to delivery of a trial packet to proceed to step C10. At step C10, the client terminal informs the server SV of connection achieved. As a result, the client terminal TM which has received a trial packet from its partner client TM establishes direct connection with its partner client TM, and completes the connecting operation. Since the received trial packet includes a source address and a source port indicative of the partner client terminal, the client terminal TM which has received the trial packet can recognize the partner client terminal's address and port number. Then, the client terminals TM move to music session operation (ensemble) with their partner clients TM.

If the maximum period of time expires in a state where a trial packet has not been delivered from the partner client TM, each of the client terminals gives "YES" at step C9 to proceed to step C11. At step C11, each of the client terminals judges whether or not the trial packet transmission by the step C7 has been carried out for the maximum times. If the trial packet transmission has not been carried out for the maximum times, each of the client terminals gives "NO" at step C11 to proceed to step C12. AT step C12, each of the client terminals informs the server SV of retry of connection, and then returns to step C6 to repeat the retry of connection formed of the above-described steps C6 to C12. If the trial packet transmission has been carried out for the maximum times, each of the client terminals gives "YES" at step C11 to inform the server SV of failure of connection at step C13 to abandon the connection to terminate the connecting operation. In this case, each of the client terminals TM is considered to have failed in the connection with its partner client terminal TM.

On the other hand, if the server SV which is repeating the above-described step S10 receives a packet indicative of "connection achieved", "notification of retry of connection" or "connection failed" from each of the clients TM, the server SV gives "YES" at step S10 to proceed to step S11. At step S11, the server SV branches to a step corresponding to the packet indicative of "connection achieved", "notification of retry of connection" or "connection failed" received from each of the client terminals TM.

More specifically, if the server SV receives packet indicative of "connection achieved", the server SV proceeds to step S12 to consider the connection as having being achieved to delete the client terminal TM from which the packet was transmitted from clients TM waiting for connection. If the server SV receives a packet indicative of "notification of retry of connection", the server SV returns to step S9 to repeat the above-described steps S9 to S11. If the server receives a packet indicative of "connection failed", the server SV proceeds to step S13 to consider the connection as having failed to delete the client terminal TM from which the packet has been transmitted from client terminals TM waiting for connection. After the step S12 or S13, the server SV returns to original stand-by state.

The above explanation described the connecting operation which enables connection of the two client terminals TM to allow direct communications between the two client terminals without the server SV. However, by realizing the connection of every possible pair of client terminals included in three or more client terminals TM participating a session, direct communications among all the client terminal pairs can be achieved. As a result, the three or more client terminals TM can participate in one session.

Second Operation Example

Next, the second operation example will be explained. In the above-described first operation example, the server SV receives packets transmitted from the client terminals TM to the port numbers P1 and P2, and identifies respective types of the NAT routers behind which the client terminals TM are located on the basis of the source port numbers of the received packets. After the type identification, the server SV sends instructions for connection to the client terminals TM, respectively, so that, by use of packets transmitted to the port number P3 from the client terminals TM in response to the instructions, the server SV guesses respective port numbers of the NAT routers to send the guessed port numbers to the client terminals TM. In this second operation example, the server SV receives packets transmitted from the client terminals TM to the port numbers P1 and P2, identifies respective types of the NAT routers behind which the client terminals TM are located on the basis of source port numbers of the received packets, and guesses respective port numbers of the NAT routers by use of the packets transmitted to the port number P2 to send the guessed port numbers to the client terminals TM.

Figure 6A:
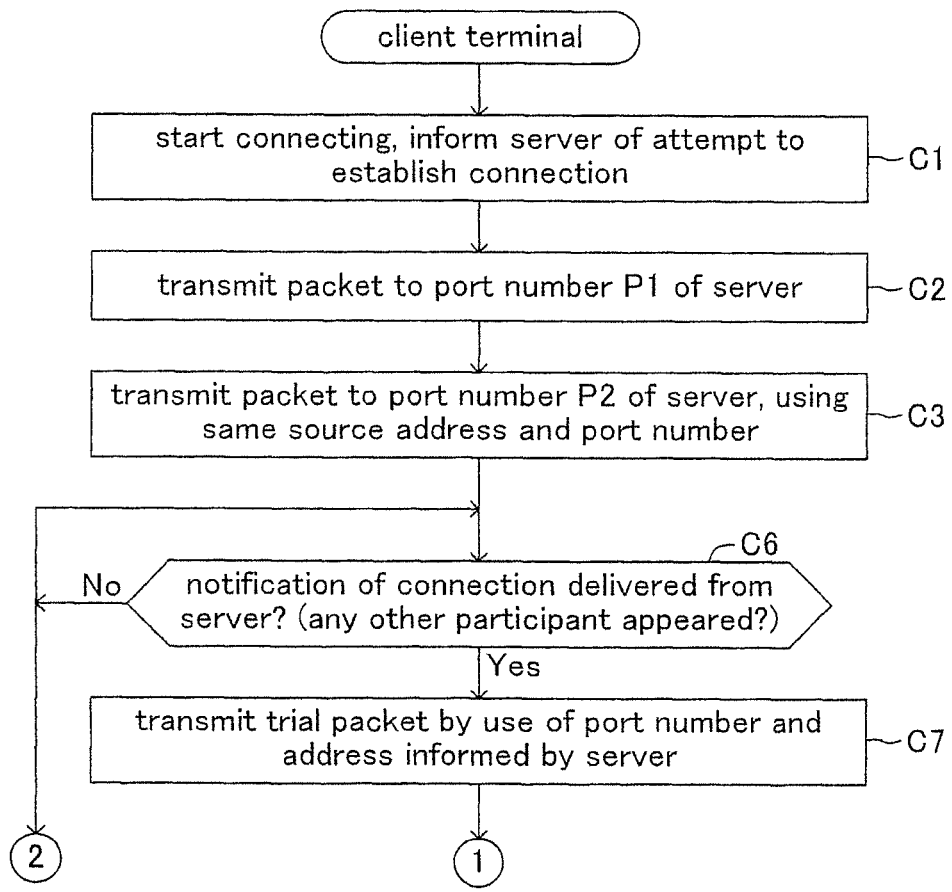
FIG. 6A indicates the first half of an example of the second connecting operation of the client terminal according to the embodiment of the invention.
Figure 6B:
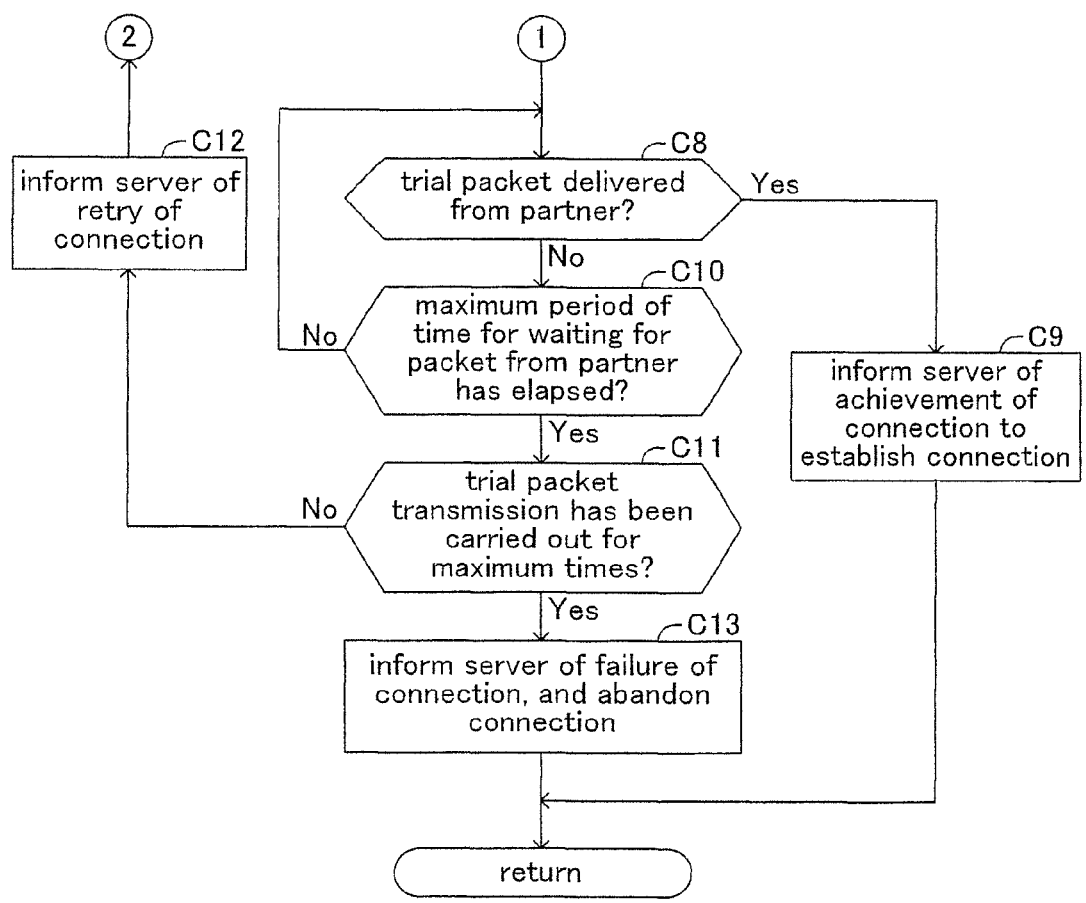
FIG. 6B indicates the latter half of the example of the second connecting operation of the client terminal.
Figure 7A:
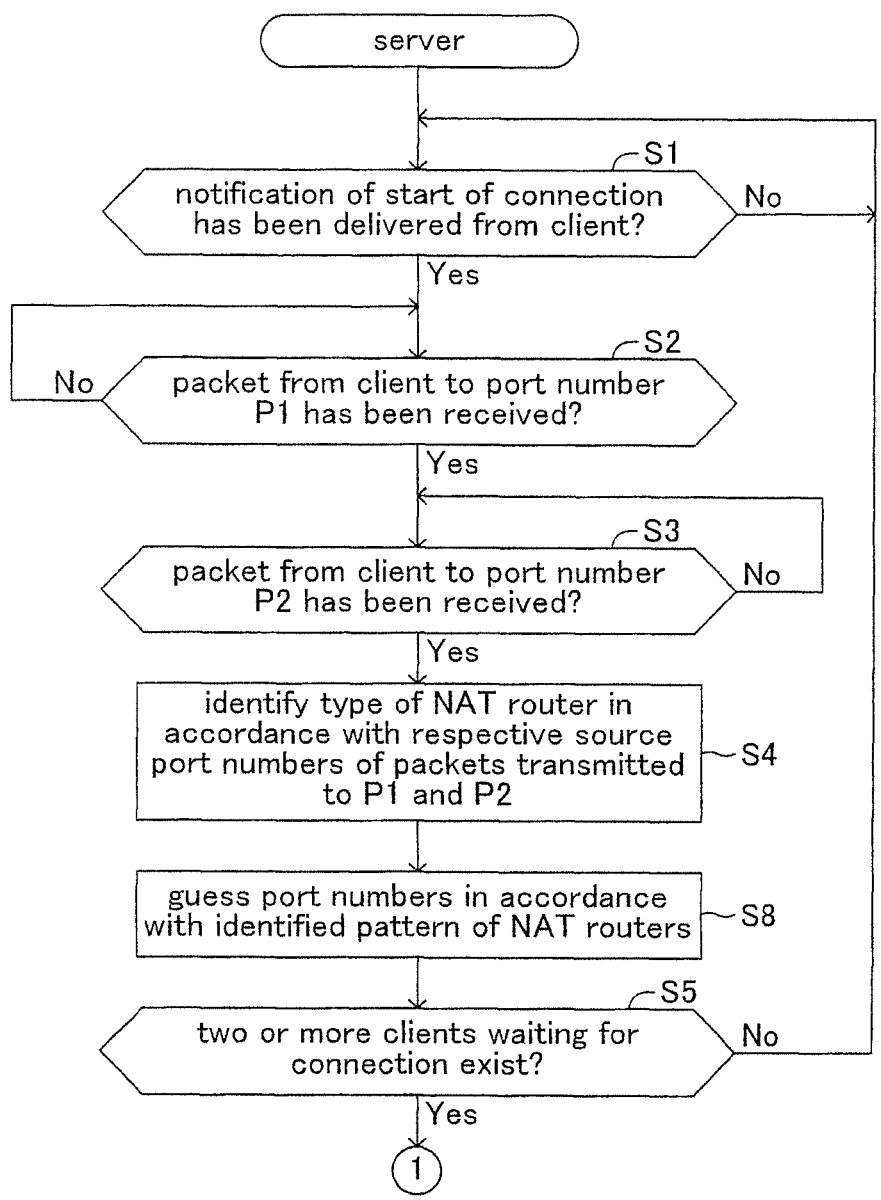
FIG. 7A indicates the first half of an example of the second connection assisting operation of the server according to the embodiment of the invention.
Figure 7B:
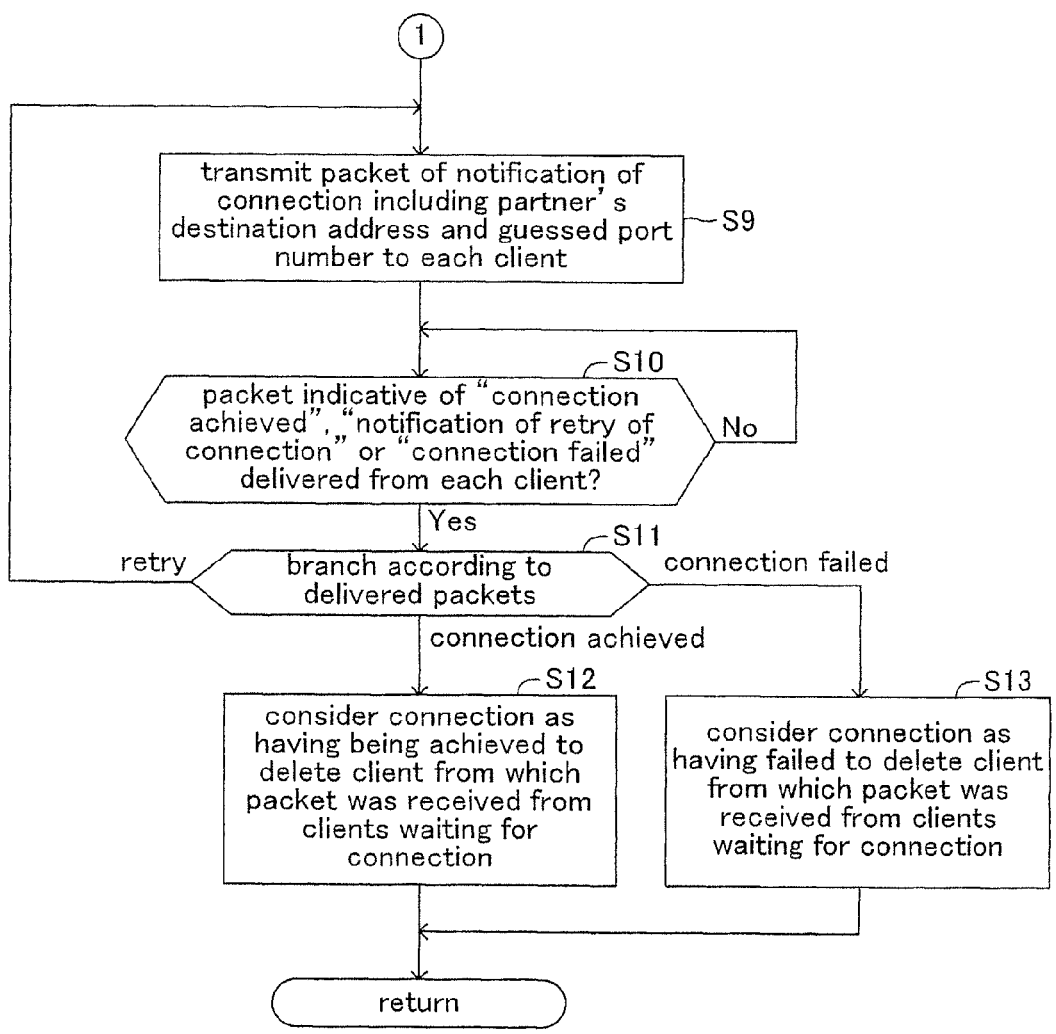
FIG. 7B indicates the latter half of the example of the second connection assisting operation of the server.

FIG. 6A and FIG. 6B indicate the second example connecting operation of the client terminal according to the embodiment of the invention. FIG. 7A and FIG. 7B indicate the second example connection assisting operation of the server according to the embodiment of the invention. In other words, in this case as well, FIG. 6A and FIG. 6B indicate a flowchart of a computer program according to the second example connecting operation, the program being executed by a CPU of the client terminal. FIG. 7A and FIG. 7B indicate a flowchart of a computer program according to the second example connection assisting operation, the program being executed by a CPU of the server.

Similarly to the first example operation, the client terminal TM informs the server SV of an attempt to establish connection at step C1 of FIG. 6A. At steps C2 and C3, the client terminal TM transmits packets to the port numbers P1 and P2 of the server SV, respectively. At step C6, the client terminal TM judges whether or not notification of connection has been delivered from the server SV. The steps C4 and C5 included in the first example operation are omitted. If the notification of connection has not been delivered from the server SV, the client terminal TM gives "NO" at step C6, and waits for the notification.

On the other hand, the server SV starts executing the program indicated in FIG. 7A and FIG. 7B. Similarly to the first example operation, more specifically, the server SV judges at steps S1 to S3 whether or not notification of start of connection has been delivered from the client TM, and whether or not packets have been delivered from the client TM to the port numbers P1 and P2. If the server SV receives the notification of start of connection and the packets destined for the port numbers P1 and P2, the server SV identifies the type of the NAT router NR behind which the client terminal which has sent the packets in accordance with the respective source port numbers of the packets delivered to the port numbers P1 and P2 at step S4 which is similar to the first example operation.

After the step S4, the server SV proceeds to step S8 which is similar to that of the first example operation to guess (define) a port number of the client terminal TM in accordance with the type identified at the above-described step S4. In this case, however, the packet transmitted to the port number P2 is used. In a case where the NAT router behind which the client terminal TM is located has been identified as pattern <3>, more specifically, "+1" is added to the source port of the packet sent to the port number P2 to be defined as a guessed port number. In a case where the NAT router of the client terminal TM has been identified not as pattern <3>, that is, in a case where the NAT router has been identified as pattern <1> or <2>, the port number of the source port of the packet sent to the port number P2 is defined as a guessed port number.

Next, the server SV judges at step S5, similarly to that of the first example operation, whether or not there are two or more clients TM waiting for connection, that is, whether, on the basis of transmission of packets to the port numbers P1 and P2 from the two or more client terminals TM which are to communicate with each other, the type identification of the NAT routers behind which the two or more client terminals are located and the guess of port numbers have been finished or not. If there are not two or more client terminals TM waiting for connection, the server SV gives "NO" at step S5 to repeat the steps S1 to S4, S8 and S5. If the server SV has received the notification of start of connection from the other client terminal TM, has received packets destined for the port numbers P1 and P2, has identified the type of the NAT router of the other client terminal, and has guessed a port number of the other client terminal, the server SV gives "YES" at step S5 to proceed to step S9 of FIG. 7B. Then, the server SV executes steps S9 to S13 which are similar to those of the first example operation. However, the steps S6 and S7 of the first example operation are omitted.

If a packet indicative of notification of connection has been delivered from the server SV to each of the client terminals, each client terminal gives "YES" at step C6 to execute the steps C7 to C13 which are similar to those of the first example operation.

Modifications

In the above-described embodiment, in a case where the server SV identifies the type of the NAT routers is pattern <3>, the sever SV defines a port number obtained by adding "+1" to the source port number used for transmission of received data as a guessed port number to inform a partner client terminal TM of the guessed port number. However, alternatively, the sever may determine an increasing or decreasing value (for example, "+2", "+3" . . . or "−2", "−3" . . . etc. which are not "+1") of the guessed port number in accordance with behaviors (translation behaviors of source port numbers) of the NAT routers NR. Then, the sever SV may define a port number obtained by adding the determined increasing or decreasing value to the source port number used for transmission of the received data or by subtracting the determined increasing or decreasing value from the source port number used for transmission of the received data as a guessed port number to inform a partner client terminal TM of the guessed port number. Because, it can be considered that some NAT routers may not sequentially change the source port number.

Further, when the sever SV identifies the type of NAT routers NR in (3) of FIG. 3A, step S4 of FIG. 5A or FIG. 7A, the sever SV may determine the difference value of translation result (translated values) of the source port numbers of packets to the port numbers P1 and P2 as the above increasing or decreasing value. Then, the server may define a port number obtained by adding the difference value to the source port number used for transmission of the received data or by subtracting the difference value from the source port number used for transmission of the received data as a guessed port number to inform a partner client terminal TM of the guessed port number. In this case, two client terminals TM located behind separate NAT routers NR can communicate directory, since the difference value expresses behaviors (translation behaviors of source port numbers) of the NAT routers NR. Additionally, in these cases as well, the client terminal TM successively transmits packets to previous and following port numbers of the informed port number and the informed address.

Further, in the above-described embodiment, for establishing connection between the two client terminals TM, two packets having destination port numbers P1 and P2, respectively, are transmitted from each of the client terminals TM to the server SV, while the server SV judges whether or not the type of the NAT routers is pattern <3> by checking a change in source port numbers of the packets. Then, the server SV guesses source port numbers in accordance with the judgment results of the NAT router type, and informs the client terminals TM of their respective partner's guessed source port number. However, the above-described embodiment may be modified such that, prior to connection of the client terminals TM, two packets having destination port numbers P1 and P2 which are different with each other are transmitted to the server SV or a different server, so that the server which has received the packets judges whether or not the NAT router is pattern <3> by checking a change in source port number of the packets. Furthermore, the client terminals receive the judgment results from the sever to grasp their respective types of the NAT routers behind which the client terminals TM are located, respectively. At the time of establishment of connection between the client terminals TM, the client terminals TM can allow the server SV to recognize respective types of the NAT routers behind which the client terminals TM are located only by informing the server SV of previously grasped NAT router types.

Alternatively, the embodiment may be modified to provide a database in which respective types of NAT routers behind which the client terminals TM are located are stored so that the type of each NAT router can be identified. In this modification, more specifically, for connection between the client terminals TM, the server SV searches for the database to identify respective types of NAT routers of the client terminals TM. Alternatively, each client terminal TM may search the database to obtain information indicative of the type of the NAT router behind which the client terminal TM is located to inform the server SV of the identified NAT router type so that the server SV can recognize the NAT router type of the client terminal TM.

What is claimed is:

1. A server included in a communication system which is formed of a first terminal located behind a first NAT router, a second terminal located behind a second NAT router, and the server which is not located behind any NAT routers, in which the first terminal and the second terminal are configured to communicate with each other through the first NAT router and the second NAT router by use of a source address, a source port number, a destination address and a destination port number, and in which the server is configured to receive first data and second data transmitted from the first terminal through the first NAT router to the server such that each of the first data and second data has a different destination port number and a common destination address, the server comprising:
   a processor configured to:
      identify the first NAT router as a NAT router of a certain type which translates the source port number into a different source port number if the destination port number is changed when a source port number used for transmission of the received first data is different from a source port number used for the transmission of the received second data;
      in a case where the first NAT router has been identified as the certain type, define, in response to reception of data transmitted from the first terminal through the first NAT router in order to inform the second terminal of a source port number which the first terminal is to use for communication between the first terminal and the second terminal, a port number obtained by adding a value to the source port number used for transmission of the received data or by subtracting a value from the source port number used for transmission of the received data as a guessed port number; and
      inform the second terminal of the guessed port number.

2. The server according to claim 1, wherein
   the certain type is a type of NAT router which sequentially changes source port number if the destination port number is changed in a case where data is transmitted by use of the same source address and source port number.

3. The server according to claim 2, wherein
   the guessed port number is defined by adding "+1" to the source port number used for transmission of the received data.

4. The server according claim 1, wherein the processor is further configured to:
   identify the first NAT router as a type other than the certain type when the source port number used for transmission of the received first data is the same as the source port number used for transmission of the received second data; and
   in a case where the first NAT router has been identified as the type other than the certain type, when the server has received data for informing the second terminal of source port number which the first terminal is to use for communication between the first terminal and the second terminal, define the source port number used for transmission of the received data as the guessed port number.

5. The server according to claim 4, wherein
   the type other than the certain type is a type which will not change source port number even if the destination address and the destination port are changed in data transmission using the same source address and source port number, or a type which sequentially changes source port number if the destination address is changed in data transmission using the same source address and source port number.

6. A method for informing a port number, the method applied to a server included in a communication system which is formed of a first terminal located behind a first NAT router, a second terminal located behind a second NAT router, and the server which is not located behind any NAT routers, and in which the first terminal and the second terminal are configured to communicate with each other through the first NAT router and the second NAT router by use of a source address, a source port number, a destination address and a destination port number, the method comprising:
   receiving first data and second data transmitted from the first terminal through the first NAT router to the server such that each of the first data and second data has a different destination port number and a common destination address;
   identifying the first NAT router as a NAT router of a certain type which translates the source port number into a different source port number if the destination port number is changed when a source port number used for transmission of the received first data is different from a source port number used for the transmission of the received second data;
   in a case where the first NAT router has been identified as the certain type, defining, in response to reception of data transmitted from the first terminal through the first NAT router in order to inform the second terminal of a source port number which the first terminal is to use for communication between the first terminal and the second terminal, a port number obtained by adding a value to the source port number used for transmission of the received data or by subtracting a value from the source port number used for transmission of the received data as a guessed port number; and
   informing the second terminal of the guessed port number.

7. A non-transitory computer readable storage medium storing a computer program for informing a port number, the program to be executed by processor in a server included in a communication system which is formed of a first terminal located behind a first NAT router, a second terminal located behind a second NAT router, and the server which is not located behind any NAT routers, and in which the first terminal and the second terminal are configured to communicate with each other through the first NAT router and the second NAT router by use of a source address, a source port number, a destination address and a destination port number, the program, when executed by the processor, causing the server to perform:

receiving first data and second data transmitted from the first terminal through the first NAT router to the server such that each of the first data and second data has a different destination port number and a common destination address;

identifying the first NAT router as a NAT router of a certain type which translates the source port number into a different source port number if the destination port number is changed when a source port number used for transmission of the received first data is different from a source port number used for the transmission of the received second data;

in a case where the first NAT router has been identified as the certain type, defining, in response to reception of data transmitted from the first terminal through the first NAT router in order to inform the second terminal of a source port number which the first terminal is to use for communication between the first terminal and the second terminal, a port number obtained by adding a value to the source port number used for transmission of the received data or by subtracting a value from the source port number used for transmission of the received data as a guessed port number; and informing the second terminal of the guessed port number.

8. A communication system comprising:
a first terminal located behind a first NAT router;
a second terminal located behind a second NAT router; and
a server which is not located behind any NAT routers,
wherein the first terminal and the second terminal are configured to communicate with each other through the first NAT router and the second NAT router by use of a source address, a source port number, a destination address and a destination port number, and wherein the server is configured to receive first data and second data transmitted from the first terminal through the first NAT router to the server such that each of the first data and second data has a different destination port number and a common destination address;

wherein the server comprises a processor configured to:
identify the first NAT router as a NAT router of a certain type which translates the source port number into a different source port number if the destination port number is changed when a source port number used for transmission of the received first data is different from a source port number used for the transmission of the received second data;

defining in a case where the first NAT router has been identified as the certain type, define, in response to reception of data transmitted from the first terminal through the first NAT router in order to inform the second terminal of a source port number which the first terminal is to use for communication between the first terminal and the second terminal, a port number obtained by adding a value to the source port number used for transmission of the received data or by subtracting a value from the source port number used for transmission of the received data as a guessed port number; and inform the second terminal of the guessed port number;

wherein the first terminal is configured to transmit data for informing the second terminal of the source port number which the first terminal is to use for communication between the first terminal and the second terminal to the server through the first NAT router; and wherein the second terminal is configured to communicate directly with the first terminal through the second NAT router and the first NAT router, using the guessed port number as the destination port number.

9. The communication system according to claim 8, wherein
the certain type is a type of NAT router which sequentially changes source port number if the destination port number is changed in a case where data is transmitted by use of the same source address and source port number.

10. The communication system according to claim 9, wherein
the guessed port number is defined by adding "+1" to the source port number used for transmission of the received data.

11. The communication system according to claim 8, wherein the processor is further configured to:
identify the first NAT router as a type other than the certain type when the source port number used for transmission of the received first data is the same as the source port number used for transmission of the received second data; and in a case where the first NAT router has been identified as the type other than the certain type, when the server has received data for informing the second terminal of source port number which the first terminal is to use for communication between the first terminal and the second terminal, define the source port number used for transmission of the received data as the guessed port number.

12. The communication system according to claim 11, wherein
the type other than the certain type is a type which will not change source port number even if the destination address and the destination port are changed in data transmission using the same source address and source port number, or a type which sequentially changes source port number if the destination address is changed in data transmission using the same source address and source port number.

13. A communication method applied to a communication system which is formed of a first terminal located behind a first NAT router, a second terminal located behind a second NAT router, and a server which is not located behind any NAT routers, and in which the first terminal and the second terminal are configured to communicate with each other through the first NAT router and the second NAT router by use of a source address, a source port number, a destination address and a destination port number, the communication method comprising:

receiving, by the server, first data and second data transmitted from the first terminal through the first NAT router to the server such that each of the first data and second data has a different destination port number and a common destination address;

identifying, by the server, the first NAT router as a NAT router of a certain type which translates the source port number into a different source port number if the destination port number is changed when a source port number used for transmission of the received first data is different from a source port number used for the transmission of the received second data;

in a case where the first NAT router has been identified as the certain type, defining, by the server, in response to reception of data transmitted from the first terminal through the first NAT router in order to inform the second terminal of a source port number which the first terminal is to use for communication between the first terminal and the second terminal, a port number obtained by adding a value to the source port number used for transmission of the received data or by subtracting a value from the source port number used for transmission of the received data as a guessed port number;

informing, by the server, the second terminal of the guessed port number;

transmitting, by the first terminal, data for informing the second terminal of a source port number which the first terminal is to use for communication between the first terminal and the second terminal to the server through the first NAT router; and communicating, by the second terminal, directly with the first terminal through the second NAT router and the first NAT router, using the guessed port number informed by the server as the destination port number.

* * * * *